United States Patent
Liu

(10) Patent No.: US 12,328,486 B2
(45) Date of Patent: Jun. 10, 2025

(54) METHOD, COMPUTER DEVICE, AND STORAGE MEDIUM FOR GENERATING VIDEO COVER

(71) Applicant: TENCENT TECHNOLOGY (SHENZHEN) COMPANY LIMITED, Shenzhen (CN)

(72) Inventor: Junyu Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 182 days.

(21) Appl. No.: 18/339,320

(22) Filed: Jun. 22, 2023

(65) Prior Publication Data
US 2023/0336839 A1   Oct. 19, 2023

Related U.S. Application Data

(63) Continuation of application No. PCT/CN2022/126007, filed on Oct. 18, 2022.

(30) Foreign Application Priority Data

Nov. 30, 2021   (CN) .......................... 202111443257.0

(51) Int. Cl.
   *H04N 21/81*   (2011.01)
   *G06F 40/109*   (2020.01)
   (Continued)

(52) U.S. Cl.
   CPC ....... *H04N 21/8153* (2013.01); *G06F 40/109* (2020.01); *G06F 40/211* (2020.01);
   (Continued)

(58) Field of Classification Search
   None
   See application file for complete search history.

(56) References Cited

U.S. PATENT DOCUMENTS

| | | | |
|---|---|---|---|
| 11,140,450 B2 | 10/2021 | Yelton et al. | |
| 2005/0225644 A1* | 10/2005 | Shibuya | H04N 1/0045 |
| | | | 707/E17.026 |

(Continued)

FOREIGN PATENT DOCUMENTS

| | | |
|---|---|---|
| CN | 110490954 A | 11/2019 |
| CN | 112100501 A | 12/2020 |
| CN | 113157973 A | 7/2021 |

OTHER PUBLICATIONS

The World Intellectual Property Organization (WIPO) International Search Report for PCT/CN2022/126007 Jan. 6, 2023 12 Pages (including translation).

*Primary Examiner* — James R Marandi
(74) *Attorney, Agent, or Firm* — ANOVA LAW GROUP, PLLC

(57) ABSTRACT

A method for generating a video cover is performed by a computer device and includes acquiring a video title and a candidate video cover of a target video; determining highlighted characters of the video title; determining typesetting parameters of the highlighted characters based on the highlighted characters and a cover parameter of the candidate video cover; and generating a target video cover of the target video by rendering the highlighted characters to the candidate video cover based on the typesetting parameters.

20 Claims, 14 Drawing Sheets

(a)

(b)

(51) Int. Cl.
*G06F 40/211* (2020.01)
*G06V 10/60* (2022.01)
*G06V 30/19* (2022.01)
*G06V 40/16* (2022.01)
*H04N 21/431* (2011.01)

(52) U.S. Cl.
CPC ........ *G06V 10/60* (2022.01); *G06V 30/19093* (2022.01); *G06V 40/161* (2022.01); *H04N 21/4312* (2013.01)

(56) References Cited

U.S. PATENT DOCUMENTS

| | | | |
|---|---|---|---|
| 2009/0258700 A1* | 10/2009 | Bright | A63F 13/44 |
| | | | 463/31 |
| 2010/0131089 A1* | 5/2010 | Anderson | G11B 27/34 |
| | | | 700/94 |
| 2014/0140583 A1 | 5/2014 | Yano et al. | |
| 2020/0314482 A1* | 10/2020 | Li | H04N 21/234363 |
| 2021/0117736 A1* | 4/2021 | Merler | G06N 5/04 |
| 2021/0201046 A1* | 7/2021 | Xia | G11B 27/031 |

* cited by examiner (a)

(b)

(a)

(b)

METHOD, COMPUTER DEVICE, AND STORAGE MEDIUM FOR GENERATING VIDEO COVER

CROSS-REFERENCES TO RELATED APPLICATIONS

This application is a continuation application of PCT Patent Application No. PCT/CN2022/126007, filed on Oct. 18, 2022, which claims priority to Chinese Patent Application No. 202111443257.0, filed on Nov. 30, 2021, all of which is incorporated herein by reference in their entirety.

FIELD OF THE TECHNOLOGY

Embodiments of the present disclosure relate to the field of multimedia production, and in particular, to a method and apparatus for generating a video cover, a device, a medium, and a program product.

BACKGROUND OF THE DISCLOSURE

A video content platform contains a large number of video resources. In order to highlight a theme, a key idea, and a main character involved in each video resource, highlighted characters are often added on a video cover to help a viewer quickly locate a target video.

The highlighted characters on the video cover are carefully designed by a video uploader. For example, a variety of artistic fonts may be provided for the highlighted characters, colors of the highlighted characters and a background color of the cover may complement each other, etc.

The production of the highlighted characters is very time-consuming. When the highlighted characters need to be quickly added to a large number of video covers, the contradiction between the production efficiency of the highlighted characters and the quality of the highlighted characters cannot be adjusted through related technologies.

SUMMARY

According to an aspect of the present disclosure, a method performed by a computer device for generating a video cover is provided. The method includes acquiring a video title and a candidate video cover of a target video; determining highlighted characters of the video title; determining typesetting parameters of the highlighted characters based on the highlighted characters and a cover parameter of the candidate video cover; and generating a target video cover of the target video by rendering the highlighted characters to the candidate video cover based on the typesetting parameters.

According to another aspect of the present disclosure, a computer device is provided and includes a processor and a memory, the memory storing a computer program, the computer program being loaded and executed by the processor to implement a method for generating a video cover. The method includes acquiring a video title and a candidate video cover of a target video; determining highlighted characters of the video title; determining typesetting parameters of the highlighted characters based on the highlighted characters and a cover parameter of the candidate video cover; and generating a target video cover of the target video by rendering the highlighted characters to the candidate video cover based on the typesetting parameters.

According to another aspect of the present disclosure, a non-transitory computer-readable storage medium, storing a computer program, the computer program being loaded and executed by a processor to implement a method for generating a video cover. The method includes acquiring a video title and a candidate video cover of a target video; determining highlighted characters of the video title; determining typesetting parameters of the highlighted characters based on the highlighted characters and a cover parameter of the candidate video cover; and generating a target video cover of the target video by rendering the highlighted characters to the candidate video cover based on the typesetting parameters.

DESCRIPTION OF EMBODIMENTS

First, terms involved in the embodiments of the present disclosure are briefly introduced.

A video cover refers to an image configured to represent a video. In an embodiment, the video cover refers to a screen displayed when the video is in a to-be-played state. For example, a homepage of a video website displays the video covers of a plurality of videos on a video website, and in response to a user touching a target video cover, a playback interface of the target video is entered. In one embodiment, the video cover is obtained by redrawing. Exemplarily, after making the video, the user makes the video cover based on a theme, an atmosphere, and a shooting technique of the video. In one embodiment, the video cover is obtained by selecting a certain frame in the video. Exemplarily, the user selects a most colorful image frame from the video as the video cover after making the video.

User generated content (UGC) is also referred to as user-generated content. The user displays the generated content through an Internet platform or provide the generated content to other users. For example, the user shares a second generated video on an account on a video website, and the user share a daily dynamic on a social platform.

Figure 1:
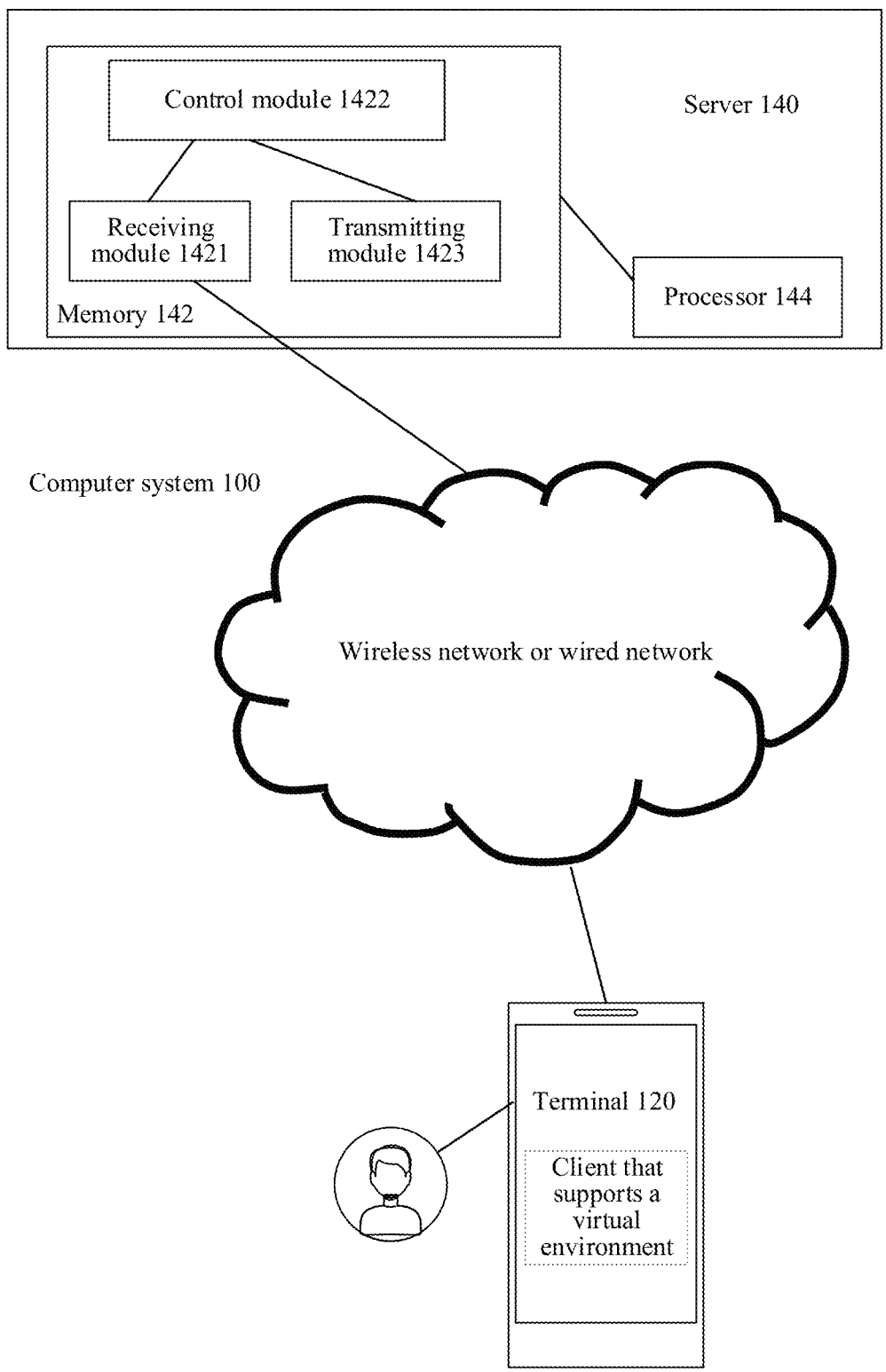
FIG. 1 is a structural block diagram of a computer system according to an exemplary embodiment.

FIG. 1 is a structural block diagram of a computer system according to an exemplary embodiment of the present disclosure. The computer system 100 includes a terminal 120 and a server 140.

The terminal 120 installs or runs an application that supports generating a video cover. In one embodiment, the application includes a client, a web page, an applet, an h5 page, and the like. In one embodiment, the application may provide a function of video playback, such as a common video playback client. In one embodiment, the application may provide a function of image processing. The application may provide a tool for editing an image (cropping, adjusting brightness, adjusting saturation, and the like). In one embodiment, the application may provide a function of audio/video processing. The application may provide a tool for editing a video (inserting a frame, removing a frame, adding a background sound effect, and the like). In the present disclosure, the terminal 120 is capable of adding highlighted characters on a candidate video cover.

The terminal 120 is connected to the server 140 through a wireless network or a wired network.

The server 140 includes at least one of one server, a plurality of servers, a cloud computing platform, and a virtualization center. Exemplarily, the server 140 includes a processor 144 and a memory 142. The memory 142 further includes a receiving module 1421, a control module 1422, and a transmitting module 1423. The receiving module 1421 is configured to receive a request transmitted by the application, such as a request to process a video title. The control module 1422 is configured to control processing of the video title and render the video title to the candidate video cover. The transmitting module 1423 is configured to transmit a response to the application, such as transmitting a generated target video cover to the application. The server 140 is configured to provide a background service for the application that support generating the video cover. In one embodiment, the server 140 is in charge of primary computing, and the terminal 120 is in charge of secondary computing. Alternatively, the server 140 is in charge of the secondary computing, and the terminal 120 is in charge of the primary computing. It is should be understood that the foregoing workload division for the video cover generation only plays an exemplary role, and does not constitute a limitation on an actual work of an execution subject of the present disclosure.

In one embodiment, the application on the terminal 120 may be applied on a different operating system platform (Android or IOS). In one embodiment, a device type of the terminal 120 includes at least one of a smart phone, a smart watch, a vehicle terminal, a wearable device, a smart television, a tablet, an e-book reader, an MP3 player, an MP4 player, a laptop, and a desktop computer. A person skilled in the art may know that there may be more or fewer terminals. For example, there may be only one terminal, or dozens or hundreds of terminals, or more terminals. In this embodiment of the present disclosure, a number of terminals and a device type are not limited.

Figure 2:
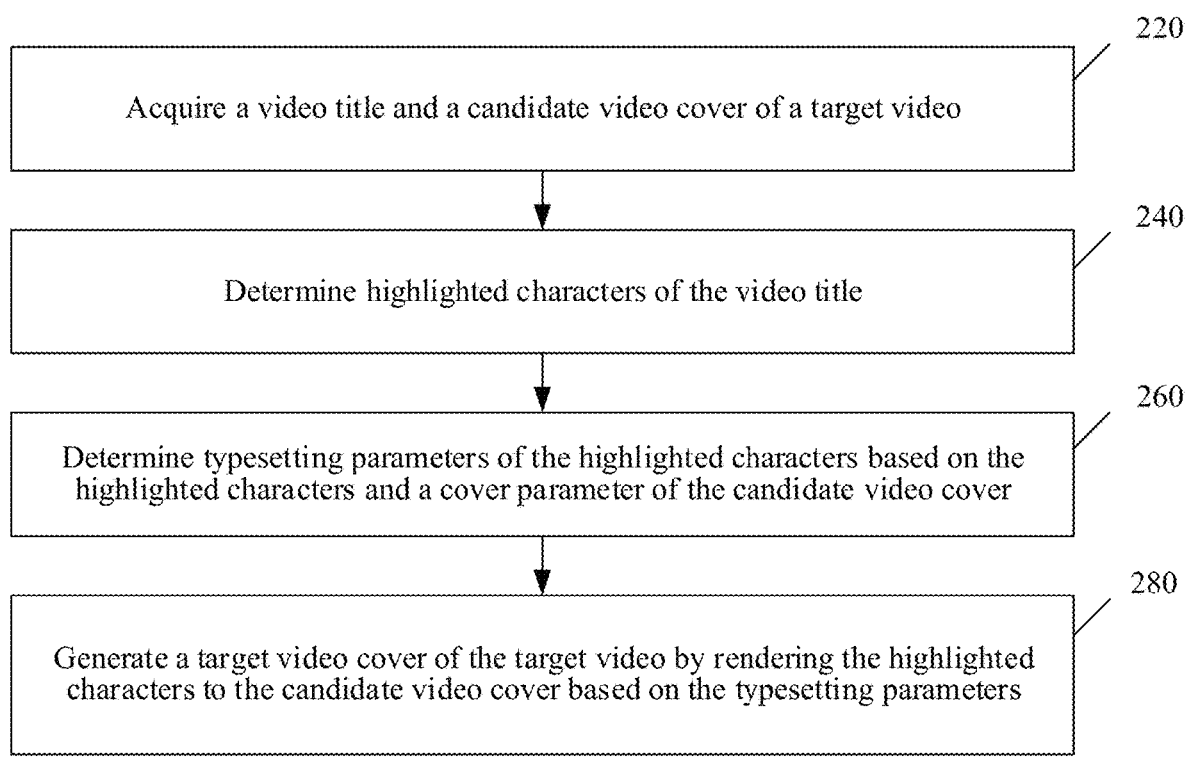
FIG. 2 is a flowchart of a method for generating a video cover according to an exemplary embodiment.

In order to improve a rendering efficiency of the highlighted characters on the video cover, FIG. 2 is a flowchart of a method for generating a video cover according to an exemplary embodiment of the present disclosure. This method is illustrated by applying the method to the computer device (possibly the terminal 120 alone, or, the server 140 alone, or, the terminal 120 and the server 140 together) shown in FIG. 1. The method includes the following steps:

Step 220: Acquire a video title and a candidate video cover of a target video.

The target video is a video configured to generate a video cover in the present disclosure.

In an embodiment, the target video is a created video uploaded by a user to a platform, for example, a video obtained by shooting a video log by the user by recording daily life and uploading the video log to a social platform or a video content platform; by shooting a video in the form of a movie, a television play, and a variety show and uploads the video to the video platform by the user; and processing the original video through secondary creation by the user. In an embodiment, the target video is a video provided by the video platform. For example, a variety of videos are displayed on the video content platform, such as Movie section-Suspense Movie-Historical score ranking list-"Inception". In an embodiment, the target video is a live video saved on a live streaming platform. The live video may be a video clip that has been completed during the live broadcast, or may be a complete video after the live broadcast is completed.

In an embodiment, the target video may be understood as the video clip, that is, a video frame that has been transmitted during video transmission. In the present disclosure, a target video cover is generated for the target video during the video transmission. In an embodiment, the target video may be understood as a complete video, that is, the target video cover is generated for the target video on the basis of the acquired complete video.

The video title is an original title configured to generate highlighted characters. The video title may be a title inputted before the video is uploaded, for example, a title inputted by a user when uploading a created video to a video platform (which may also be referred to as a brief introduction, a content description, and the like). The video title may also be a title generated by the video platform based on the target video. For example, the target video is a video obtained by the user through secondary creation, and the video platform generates the original title based on relevant information of the video before the secondary creation. The video title is only used as the original title that generates the highlighted characters in the present disclosure, and a source of the original title is not limited in the present disclosure.

A candidate video cover is a video frame configured to add the highlighted characters in the present disclosure. The candidate video cover may be a certain frame in the target video or an image related to the target video. For example, the target video is a video obtained by the secondary creation of the movie, and the candidate video cover is a promotional poster of the movie (the poster image does not appear in the movie).

In an embodiment, the computer device extracts a certain frame from the target video as the candidate video cover, and the process is as follows. The computer device acquires the target video, then the computer device acquires a video frame carrying a human face in the target video through a human face detection model, and finally uses the video frame with the human face as the candidate video cover. The human face detection model is a machine learning model for predicting the probability of carrying the human face in the video frame of the target video. In one embodiment, the human face detection model is obtained by training an image set based on a sample image carrying a human face. In one embodiment, the image set includes a first sample image and a second sample image. The first sample image is a sample image carrying a human face, and the second sample image is a sample image not carrying a human face. In one embodiment, the image set further includes a third sample image. The third sample image is a sample image carrying part of the human face (schematically, the third sample image only carries part of organs of the human face, such as a chin, ears, and eyes). The above three sample images correspond to manually calibrated face probability labels.

In one embodiment, the human face detection model is a multi-task convolutional neural network (MTCNN). In one embodiment, the human face detection model is a FaceNet (a type of neural networks for the human face detection). In one embodiment, after acquiring the video frame with the human face, the computer device also performs a defect treatment on the video frame with the human face (such as removing a black edge, a frosted glass edge, and so on).

Step 240: Determine highlighted characters of the video title.

After acquiring the video title and the candidate video cover of the target video, the computer device determines the highlighted characters of the video title.

The highlighted characters in the present disclosure refers to the text added to the candidate video cover to enhance an amount of information carried by the candidate video cover. Moreover, the highlighted characters can highlight a subject of the target video.

In an embodiment, the computer device may determine the highlighted characters of the video title through one or more of the following four exemplary manners.

At least one phrase of the video title is intercepted as the highlighted characters based on a syntactic structure of the video title.

The video title with a character recognition result and/or an audio recognition result of the target video is matched to obtain the highlighted characters.

The video title is inputted to a text generation model and obtain the highlighted characters outputted by the text generation model.

The video title is matched to a video tag to obtain the highlighted characters.

Step 260: Determine typesetting parameters of the highlighted characters based on the highlighted characters and a cover parameter of the candidate video cover After determining the highlighted characters, the computer device determines the typesetting parameters of the highlighted characters based on the highlighted characters and the cover parameter of the candidate video cover. The cover parameter refers to parameter information carried by the candidate video cover, such as a height and width of the candidate video cover, a human face box on the candidate video cover, a text box with built-in characters on the candidate video cover, a brightness of the candidate video cover, a style label of the candidate video cover, and so on.

The typesetting parameters of the highlighted characters refers to a typography-related parameter of the highlighted characters rendered on the candidate video cover, such as a font size, a rendering position, a color, and a font of the highlighted characters.

In an embodiment, all or part of the typesetting parameters of the highlighted characters are preset.

In an embodiment, the computer device determines, based on the highlighted characters and a cover parameter of the candidate video cover, typesetting parameters of the highlighted characters, which can include one or more of the following exemplary four manners.

The font size of the highlighted characters is determined based on a line with the largest number of characters in the highlighted characters and a width of the candidate video cover.

A rendering position of highlighted characters are determined based on a degree of overlap between a text box of the highlighted characters and a human face box on a candidate video cover.

The color of the highlighted characters is determined based on the brightness at the rendering position of the highlighted characters.

The font of the highlighted characters is determined based on the style of the candidate video cover.

Step 280: Generate a target video cover of the target video by rendering the highlighted characters to the candidate video cover based on the typesetting parameters In an embodiment, the computer device generates a target video cover of the target video by rendering the highlighted characters to the candidate video cover based on the typesetting parameters.

Based on the above, by determining the highlighted characters of the video title and the typesetting parameters of the highlighted characters, the highlighted characters are rendered to the candidate video cover, and a method for generating the video cover is provided. This method does not require the user to design highlighted characters one by one, but can determine the content and the typesetting parameters of the highlighted characters only according to the video title and the candidate video cover, which greatly improves the rendering efficiency of the highlighted characters. For quickly adding the highlighted characters for a plurality videos, the contradiction between the production efficiency of the highlighted characters and the quality of the highlighted characters are adjusted, that is, the production efficiency of the highlighted characters and the quality of the highlighted characters are taken into account.

Referring back to Step 240, for determining the highlighted characters of the video title based on that at least one phrase of the video title is intercept as the highlighted characters based on a syntactic structure of the video title, exemplary details are described as follows.

Syntactic structure: The syntactic structure indicates that the video title includes at least one sentence, and each sentence includes at least one phrase, which is divided based on punctuation.

In an embodiment, the video title may be divided into at least one statement based on any one of a period, an exclamation mark, and a question mark in the video title. Any sentence in the video title may be divided into at least two phrases based on any one of comma or semicolon in the video title. For example, a video title is "A, B, C; D. E, F? G!". It may be determined that the video title includes three statements "A, B, C; D.", "E, F?", and "G!". The first statement includes four phrases A, B, C, and D, the second statement includes two phrases E and F, and the third statement includes one phrase G.

For example, a video title is "When I went out and saw puppies of other people, I cannot help but stop, and Dad bought two puppies that can bark, which made me so happy. I like them so much, and it was quite comfortable to touch!".

In an exemplary embodiment, a computer device selects a first statement of the video title. The computer device outputs m phrases in the first statement as m lines of texts of highlighted characters in sequence when a number m of phrases in the first statement is not greater than a first threshold n. The computer device outputs n phrases in the first statement as n lines of texts of highlighted characters in sequence when a number m of phrases in the first statement is greater than a first threshold n, m and n being positive integers.

In one embodiment, the first threshold n is 3. In one embodiment, the n phrases are first n phrases, last n phrases, or middle n phrases in the first statement. In one embodiment, the n phrases are n phrases with a high degree of importance that are selected from the first statement through an attention mechanism of an artificial intelligence model.

For example, the above video title includes only one statement, and the first statement includes 6 phrases. First 3 phrases "When I went out and saw puppies of other people", "I cannot help but stop", and "Dad bought two puppies that can bark" are selected from the first statement, and are outputted as 3 lines of highlighted characters in sequence.

Figure 3:
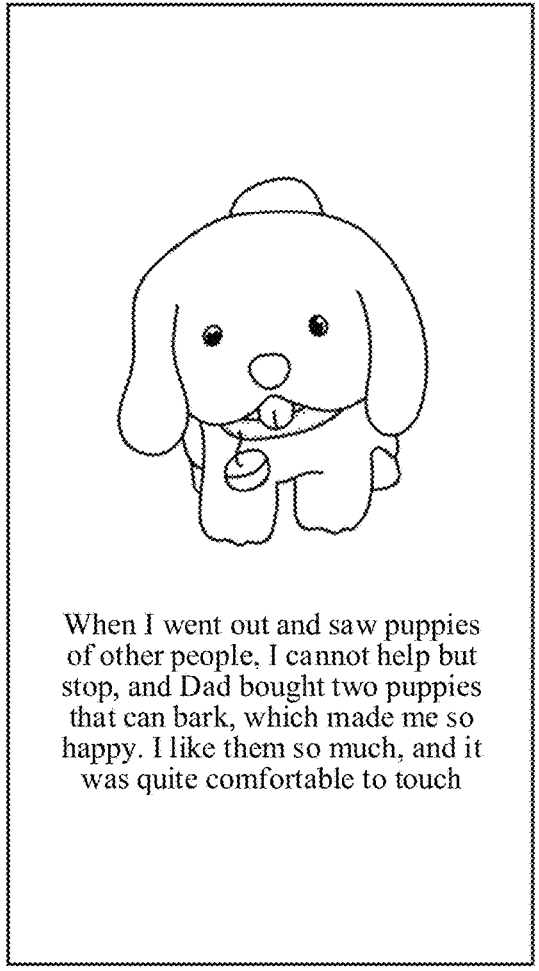
FIG. 3 is a schematic diagram of a target video cover obtained based on a first possible highlighted character determination manner according to an exemplary embodiment.
Figure 3:
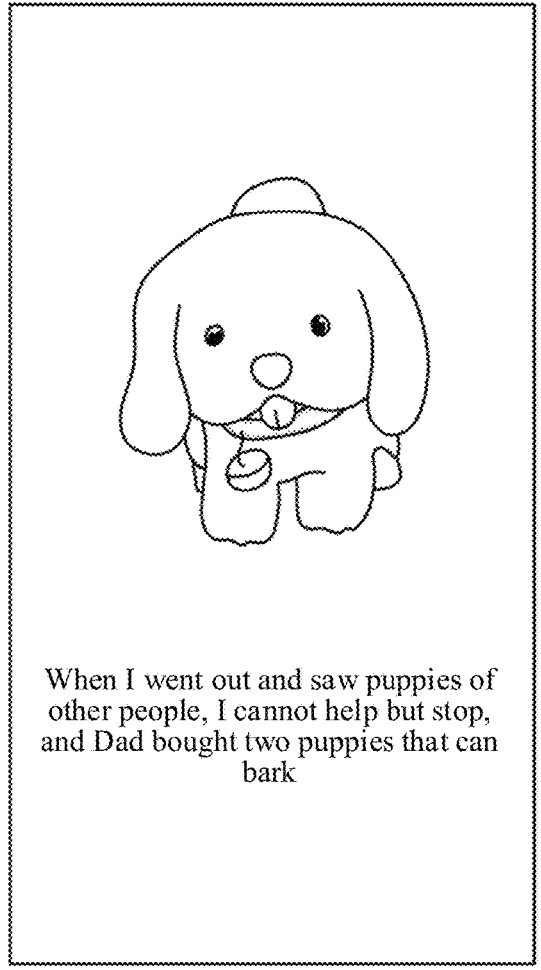

Exemplarily, FIG. 3(a) shows that the video title is directly rendered to the candidate video cover. It can be learned that the highlighted characters are very bloated in this case and does not serve to highlight a focus of the target video. FIG. 3(b) shows that the video title is intercepted and rendered to the candidate video cover. In this case, the highlighted characters are closer to a reading habit of a viewer and reflects a theme of the target video.

Based on the above, by intercepting the phrase of the first statement in the video title, a method for determining the highlighted characters is provided, the difficulty of determining the highlighted characters is reduced, and the rendering efficiency of the highlighted characters are improved.

Referring back to Step 240, for determining the highlighted characters of the video title based on that the video title with a character recognition result and/or an audio recognition result of the target video is matched to obtain the highlighted characters, exemplary details are described as follows.

The video title with a character recognition result and/or an audio recognition result of the target video is matched to obtain the highlighted characters.

In an embodiment, the computer device matches the video title with a character recognition result and/or an audio recognition result of the target video to obtain a matching phrase; the computer device outputs p matching phrases as p lines of texts highlighted characters in sequence when a number p of the matching phrases is not greater than a second threshold value q; and the computer device outputs q phrases in the p matching phrases into q lines of texts of highlighted characters in sequence when a number p of the matching phrases is greater than the second threshold q, p and q being positive integers.

In one embodiment, the second threshold value q is 3. In one embodiment, the q phrases are first q phrases, last q phrases, or middle q phrases within the p phrases. In one embodiment, the q phrases are q phrases having a higher degree of importance selected from a matching result through an attention mechanism of an artificial intelligence model.

In one embodiment, the character recognition result is obtained based on optical character recognition (OCR), and the audio recognition result is obtained based on automatic speech recognition (ASR).

In an embodiment, a manner in which the computer device matches the video title with the character recognition result and/or the audio recognition result of the target video may include the following.

The computer device intercepts at least one phrase in the video title based on a syntactic structure of the video title; then, the computer device matches the at least one phrase with the character recognition result and/or the audio recognition result of the target video; and the computer device determines the matching phrase that is of the at least one phrase and whose number of occurrences in the character recognition result and/or the audio recognition result is greater than a number threshold.

Figure 4:
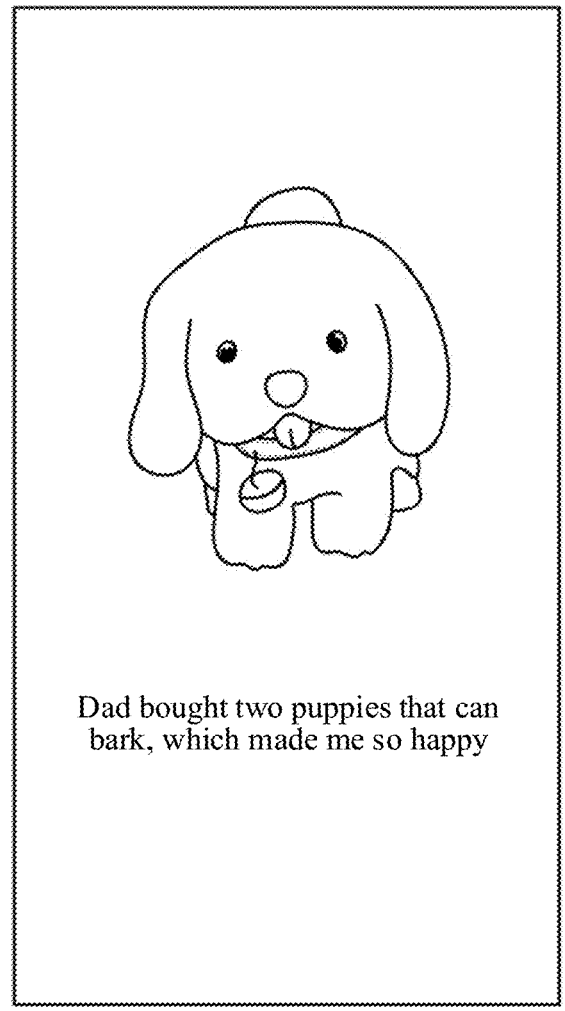
FIG. 4 is a schematic diagram of a target video cover obtained based on a second possible highlighted character determination manner according to an exemplary embodiment.

Exemplarily, with the syntactic structure in the first possible highlighted character determination manner, the computer device intercepts at least one phrase of the video title (exemplarily, the at least one phrase is the full phrase of the video title) of the "when I went out and saw puppies of other people", "I cannot help but stop", "Dad bought two puppies that can bark", "the baby was so happy", "I like them so much", and "it was quite comfortable to touch!". The computer device determines that "Dad bought two puppies that can bark" appears 4 times in the character recognition result and/or the audio recognition result of the target video, and "the baby was so happy" appears 3 times, all reaching the number threshold of 3, then renders the two phrases on the candidate video cover. Exemplarily, FIG. 4 shows the target video cover obtained by rendering the above title to the candidate video cover after matching the character recognition result and/or the audio recognition result.

Based on the above, by matching the video title to the character recognition result and/or the audio recognition result of the target video, a method for determining the highlighted characters is provided, which strengthens the degree of association between the highlighted characters and the content of the target video, so that the highlighted characters can better reflect theme of the target video and the rendering efficiency of the highlighted characters are improved.

Referring back to Step 240, for determining the highlighted characters of the video title based on that the obtained highlighted characters are outputted based on the video title is inputted to the text generation model, exemplary details are described as follows.

In an embodiment, the computer device inputs the video title into the text generation model and outputs the candidate highlighted characters. Then, the computer device outputs k phrases as k lines of texts of highlighted characters in sequence when a number k of phrases in the candidate highlighted characters are not greater than a third threshold value j; and the computer device outputs j phrases in the candidate highlighted characters as j lines of texts of highlighted characters in sequence when a number k of phrases in the candidate highlighted characters are greater than the third threshold value j, where k and j being positive integers.

In one embodiment, the value of j is 3. In one embodiment, the j phrases are first j phrases, last j phrases, or middle j phrases in the candidate highlighted characters. In one embodiment, the j phrases are j phrases having a higher degree of importance selected from the candidate highlighted characters through an attention mechanism of an artificial intelligence model.

In one embodiment, the text generation model outputs the candidate highlighted characters that matches the main idea by summarizing a main idea of the video title. For example, the above video title "When I went out and saw puppies of other people, I cannot help but stop, and Dad bought two puppies that can bark, which made me so happy. I like them so much, and it was quite comfortable to touch!", the text generation model determines keywords of the title "puppy", "baby", and "like". The text generation model selects the statement set that matches the keyword from a basic corpus, and then selects the statement with the highest similarity to the video title from the sentence set as the candidate highlighted characters, such as "Dad brought the puppies back to the baby, and the baby liked them very much".

Figure 5:
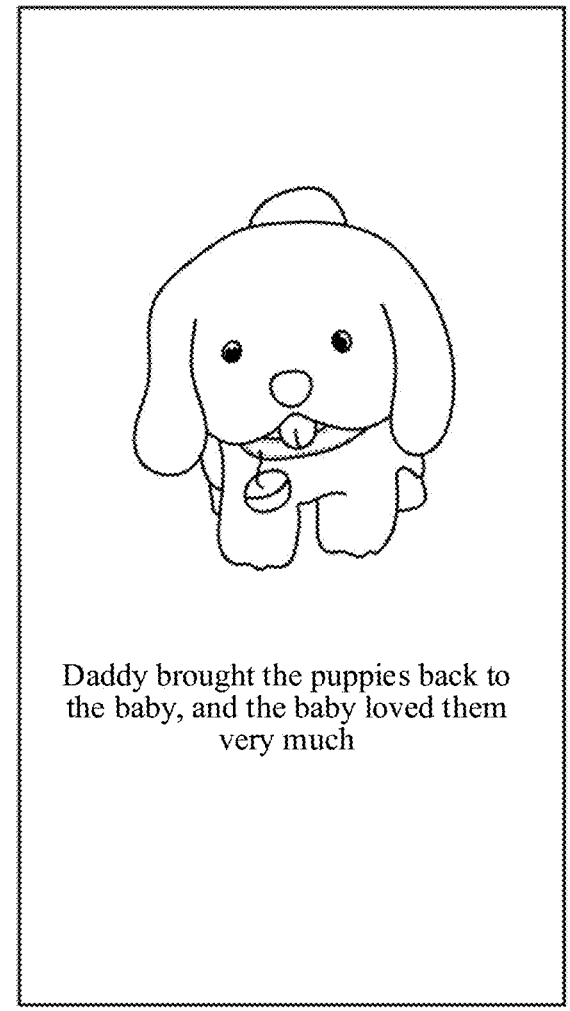
FIG. 5 is a schematic diagram of a target video cover obtained based on a third possible highlighted character determination manner according to an exemplary embodiment.

In one embodiment, after the candidate highlighted characters are outputted, the computer device divides the candidate highlighted characters by a word segmentation tool and obtains the k phrases of the candidate highlighted characters. For example, the word segmentation tool is configured to obtain two phrases for the candidate highlighted characters: "Daddy brought the baby the puppies" and "the baby loved them very much". Exemplarily, FIG. 5 shows a schematic diagram of rendering the above two phrases to the target video cover obtained by the candidate video cover.

Based on the above, a method for determining the highlighted characters is provided by outputting the highlighted characters through the text generation model. By summarizing the main idea of the video title, the highlighted characters express the video title with more concise text, and improves the rendering efficiency of the highlighted characters.

Referring back to Step 240, for determining the highlighted characters of the video title based on that the highlighted characters are obtained based on the matching between the video title and a video tag, exemplary details are described as follows.

The video tag refers to a tag corresponding to the target video. For example, if the target video is a video related to puppies, the tag may be "animal-dog"; if the target video is "Inception", the tag may be "Movie Section-Suspense Movie-Historical score ranking list"; and if the target video is "Naruto", the tag may be "Anime-Hot Blood".

Figure 6:
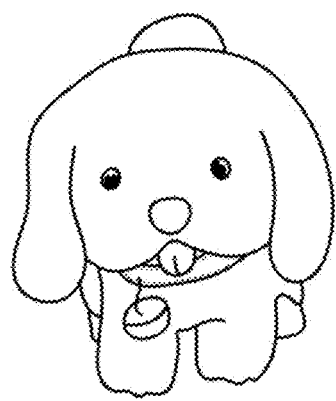
FIG. 6 is a schematic diagram of a target video cover obtained based on a fourth possible highlighted character determination method according to an exemplary embodiment.

In an embodiment, if a relevant text of the video tag appears in the phrase based on the video title, at least one phrase including the relevant text is selected as the highlighted characters. For example, if the video title "When I went out and saw puppies of other people, I cannot help but stop, and Dad bought two puppies that can bark, which made me so happy. I like them so much, and it was quite comfortable to touch!" are chosen as the highlighted characters, the tag of the video title is "Animal" and "Dog". Exemplarily, FIG. 6 is a schematic diagram of rendering the above phrases to the target video cover obtained by the candidate video cover.

Based on the above, through the matching of the video title and the video tag, the highlighted characters are obtained, which provides a manner to determine the highlighted characters, strengthens the degree of association between the highlighted characters and the video tag, and improves the rendering efficiency of the highlighted characters.

Based on the above, the first possible highlighted character determination manner to the fourth possible highlighted character determination manner not only provide four manners to determine the highlighted characters, but also provide a manner to improve the rendering efficiency of the highlighted characters.

Referring back to Step 260, for determining the typesetting parameter based on that the font size of the highlighted characters is determined based on a line with the largest number of characters in the highlighted characters and a width of the candidate video cover, exemplary details are described as follows.

In an embodiment, the computer device first determines a line with the largest number of characters in the highlighted characters; then, the computer device determines a total width of each text in the line with the largest number of characters and a width of a single text based on the width of the candidate video cover; and finally, the computer device determines the font size of the highlighted characters based on the width of the single text. For example, the computer device determines the total width of each text in the line with the largest number of characters based on the width of the candidate video cover, and determines the width of the single text in the line with the largest number of characters based on that total width and the number of characters in the line with the largest number of characters.

Step 240 has determined the highlighted characters, and the number of lines of highlighted characters and the number of characters per line can be determined.

Exemplarily, the computer device determines that the highlighted characters are divided into a line, the number of words in each line is 11, 12, 11, 10, . . . , and 11, and determines that the line having the largest number of words is a second line. The width of the candidate video cover is w. According to a preset ratio b, it is determined that the total width of each text in the second line is w*b, and the width of the single text in the second line is (w*b)/12.

In one embodiment, if the candidate video cover is a horizontal image, a value of the preset ratio b is 40%, and if the candidate video cover is a vertical image, a value of the preset ratio b is 80%.

Figure 7:
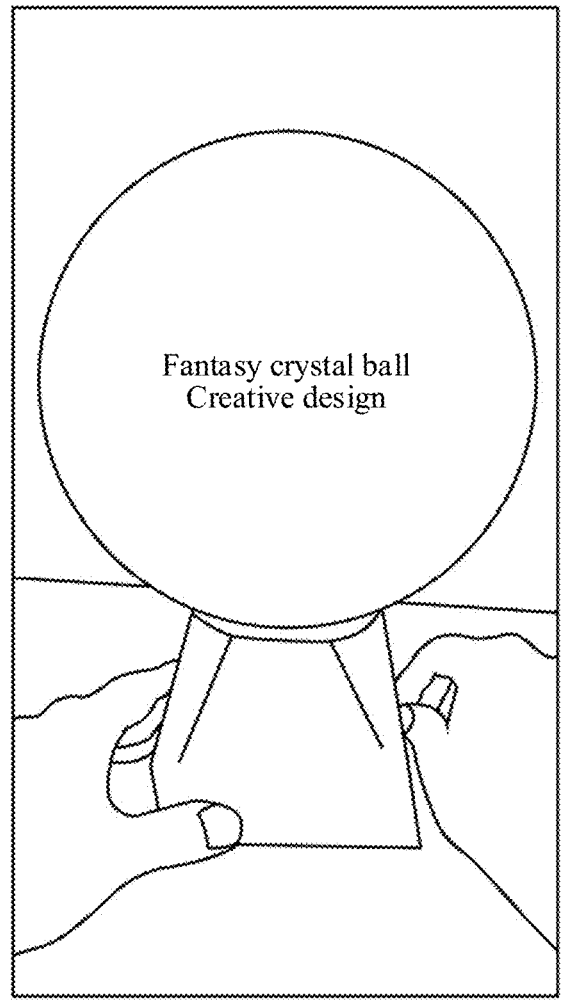
FIG. 7 is a schematic diagram of a target video cover obtained based on a first possible typesetting parameter determination manner according to an exemplary embodiment.

Exemplarily, FIG. 7 shows the target video cover obtained by rendering the highlighted characters on the candidate video cover. The width of the candidate video cover is 720 px, and the highlighted characters has two lines of 5 characters and 4 characters respectively, and the font size is (720*80%)/5=115 px.

Based on the above, the font size of the highlighted characters is determined and a method for determining the font size of the highlighted characters is provided through the width of the highlighted characters and the candidate video cover, which makes the highlighted characters appear more symmetrical and decent on the candidate video cover and further improves the rendering efficiency of the highlighted characters.

Referring back to Step 260, for determining the typesetting parameter based on that a rendering position of highlighted characters are determined based on a degree of overlap between a text box of the highlighted characters and a human face box on a candidate video cover, exemplary details are described as follows.

In an embodiment, a computer device determines the text box of the highlighted characters based on the highlighted characters and a font size of the highlighted characters. Then the computer device determines the human face box on the candidate video cover. The computer device calculates an overlapping area between the text box of the highlighted characters in each of at least two candidate positions on the candidate video cover and the human face box by sliding a window. Finally, the computer device uses, as the rendering position of the highlighted characters on the candidate video cover, the candidate position of the text box of the highlighted characters with the smallest overlapping area.

For example, there are lines of highlighted characters in total, a number of characters in a line with the largest number of characters is c, and a font size is d. It may be determined that a height of the text box of the highlighted characters are a*d and a width is c*d.

For example, a width of the candidate video cover is w, and a height of the candidate video cover is h. In one embodiment, if the window is slid from left to right, a size is 0.1 w, and if the window is slid from top to bottom, the size is 0.1 h. For example, coordinates of an upper left corner of a text box of initial highlighted characters are (0, h). If the window is swiped to the right at a time, the coordinates of the upper left corner of the text box of the highlighted characters are (0.1 w, h). If the window is swiped downward at a time, the coordinates of the upper left corner of the text box of the highlighted characters are (0, 0.9 h).

Figure 8:
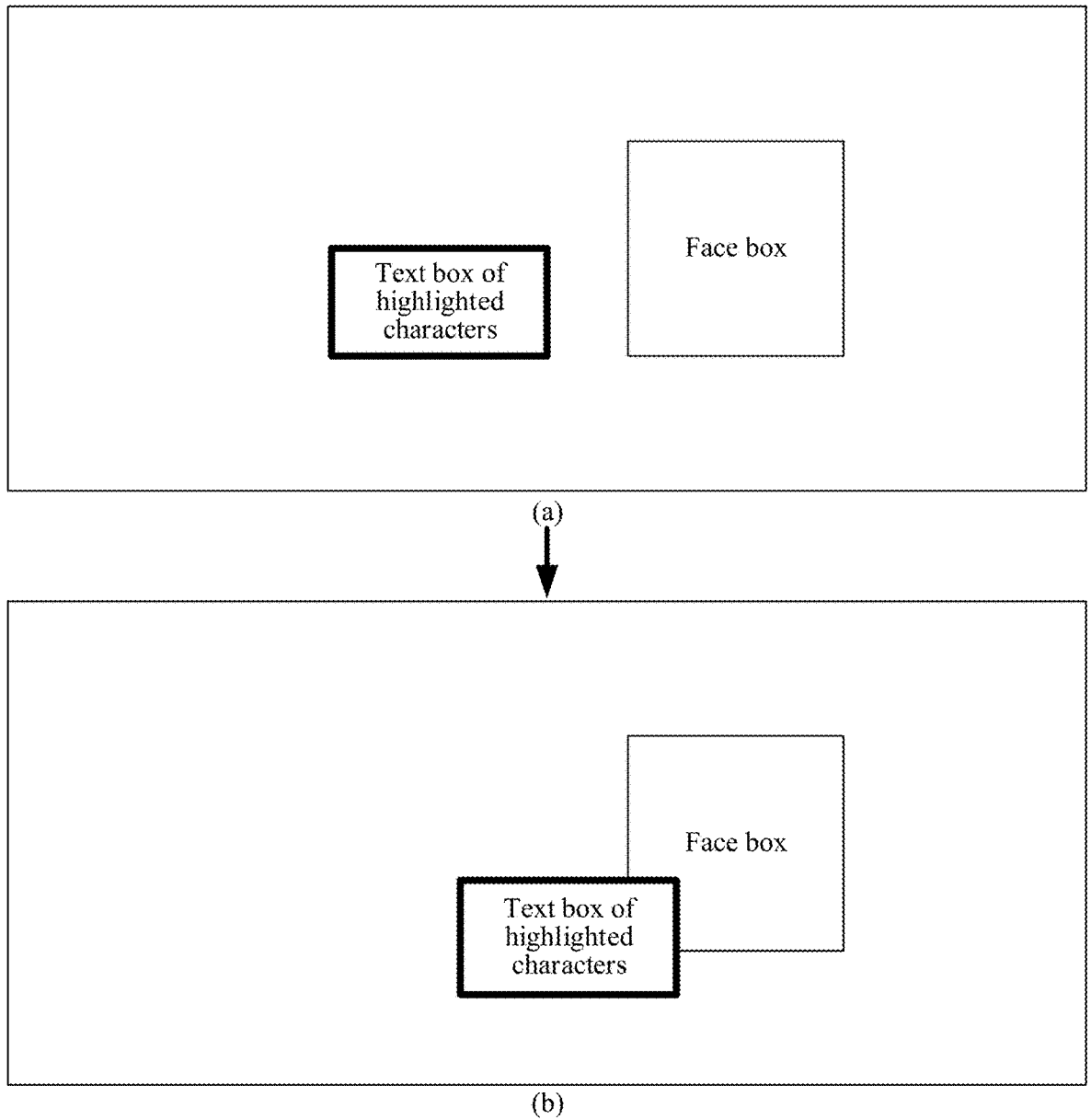
FIG. 8 is a schematic diagram of calculating an overlapping area of text boxes of highlighted characters and human face boxes at two candidate positions according to an exemplary embodiment.

Exemplarily, FIG. 8 is a schematic diagram of calculating an overlapping area of a text box of highlighted characters with a human face box by sliding the window. FIG. 8(a) shows the text box of the highlighted characters at a first candidate position, and FIG. 8(b) shows the text box of the highlighted characters at a second candidate position. An overlapping area between the text box of the highlighted characters in each of at least two candidate positions on the candidate video cover and the human face box can be calculated by sliding a window.

In an embodiment, when at least two equal minimum overlapping areas are defined, the computer device determines at least two regions covered by the text box of at least two highlighted characters corresponding to the minimum overlapping areas (that is to say, when the overlapping area between two or more candidate positions and the human face box is a minimum overlapping area, at least two regions covered by the text box of the at least two highlighted characters corresponding to two or more candidate positions are determined). Then, the computer device uses, as the rendering position of the highlighted characters on the candidate video cover, a candidate position of a region with the minimum variance of red, green, and blue (RGB) in the at least two regions (a region with the smallest change range in regions covered by the text box).

In an embodiment, a computer device determines the text box of the highlighted characters based on the highlighted characters and a font size of the highlighted characters. Then, the computer device determines the human face box and the text box with the built-in characters on the candidate video cover. The computer device calculates a sum of a first overlapping area and a second overlapping area of the text box of the highlighted characters on the at least two candidate positions of the candidate video cover by sliding a window. The computer device uses, as the rendering position of the highlighted characters on the candidate video cover, a candidate position of a text box of the highlighted characters with the minimum sum.

The first overlapping area is an overlapping area of the text box of the highlighted characters and the built-in text box, and the second overlapping area is an overlapping area of the text box of the highlighted characters and the human face box.

In one embodiment, the text on the candidate video cover is detected by an optical character recognition (OCR).

Figure 9:
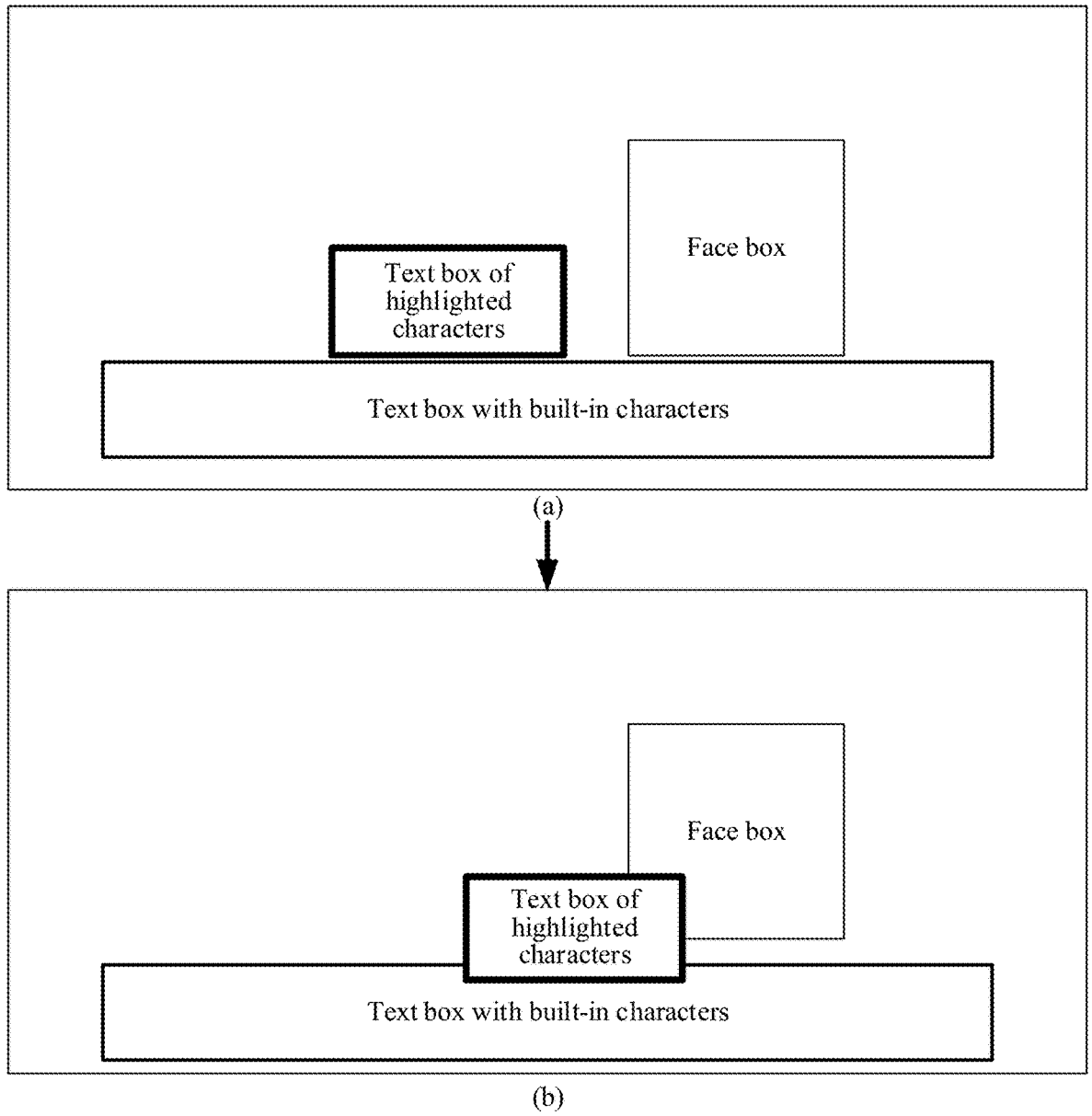
FIG. 9 is a schematic diagram of calculating a sum of a first overlapping area and a second overlapping area of text boxes of highlighted characters at two candidate positions according to an exemplary embodiment.

Exemplarily, FIG. 9 shows a sum of a first overlapping area and a second overlapping area of a text box for highlighted characters by sliding the window. FIG. 9(a) shows the text box of the highlighted characters at a first candidate position, and FIG. 9(b) shows the text box of the highlighted characters at a second candidate position. The sum of the first overlapping area and the second overlapping area of the text box of the highlighted characters on the at least two candidate positions of the candidate video cover can be calculated by sliding a window.

Figure 10:
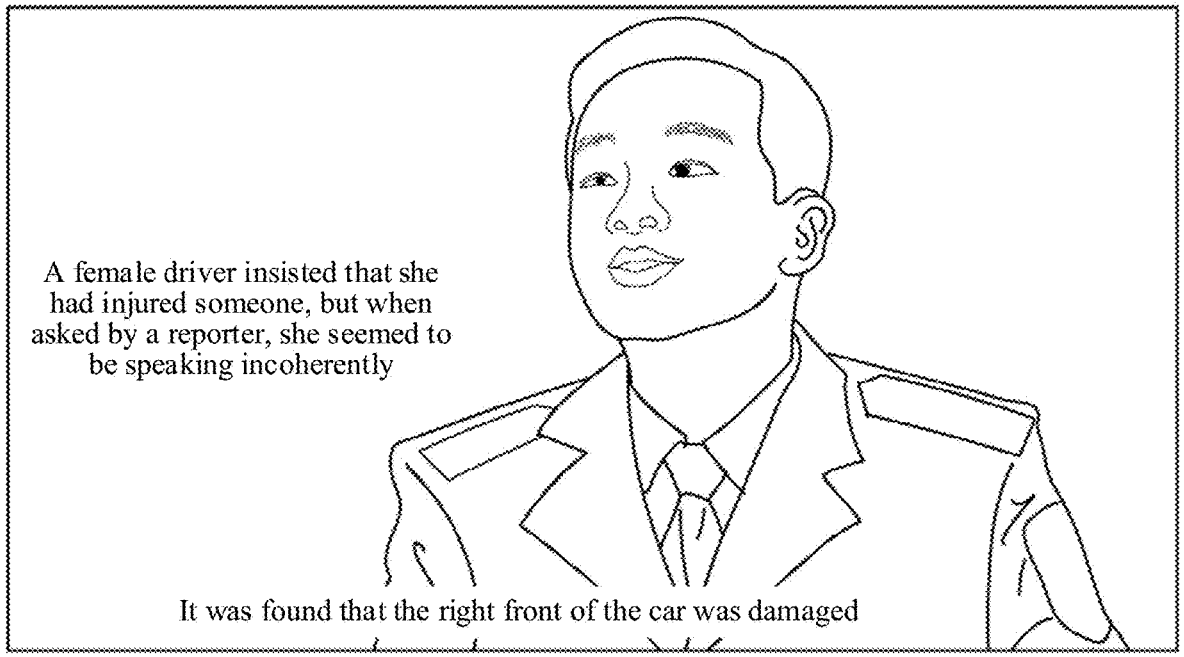
FIG. 10 is a schematic diagram of a target video cover obtained based on a second possible typesetting parameter determination manner according to an exemplary embodiment.

FIG. 10 shows rendering the highlighted characters to the target video cover obtained by the candidate video cover based on the rendering position of the highlighted characters. "The right front of the front of the car is found to be damaged" is the text that comes with the candidate video cover.

In one embodiment, when the candidate video cover is a horizontal image, the highlighted characters are often set in the lower ⅓ to a bottom region of the candidate video cover. When the candidate video cover is a vertical image, the highlighted characters are often centered and aligned in the candidate video cover.

Figure 11:
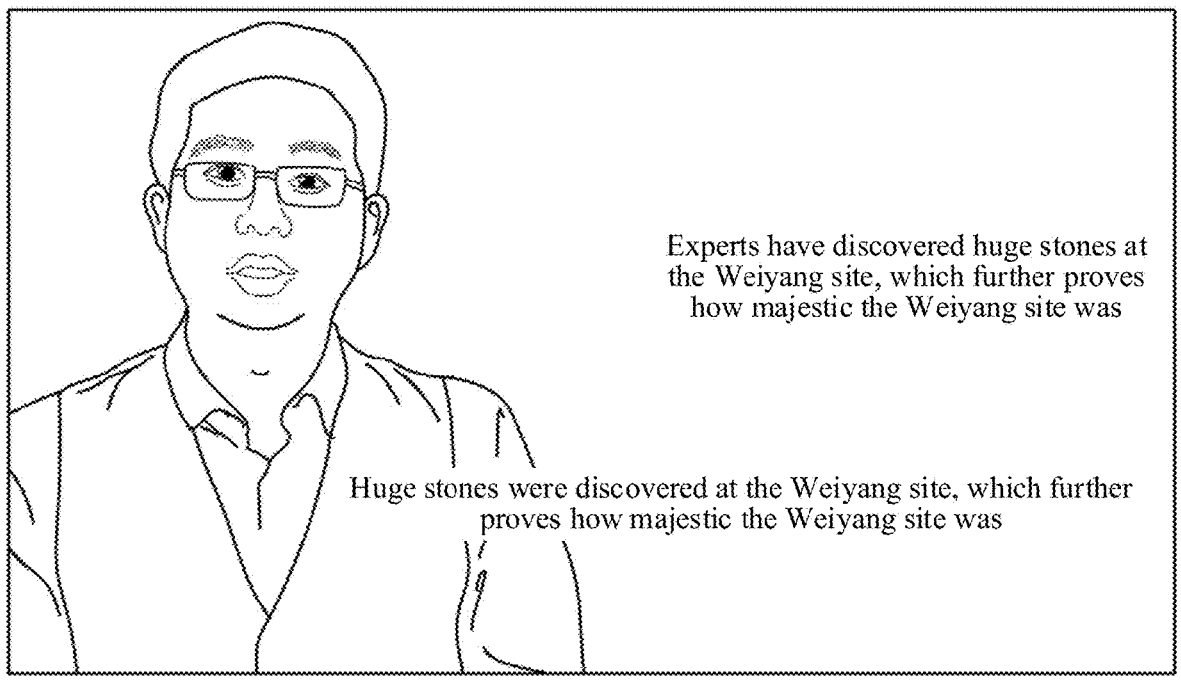
FIG. 11 is a schematic diagram of a target video cover obtained based on a second possible typesetting parameter determination manner according to another exemplary embodiment.

In an embodiment, if the self-contained text of the detected candidate video cover includes the content of the highlighted characters, the method for generating the target video cover is no longer performed. Exemplarily, FIG. 11 shows a schematic diagram of rendering the highlighted characters to the candidate video cover. The text in a right region in FIG. 11 is the built-in characters, and the text close to the lower region is the highlighted characters. It can be seen that the text information on FIG. 11 is repeated, which is very bloated.

Based on the above, the rendering position of the highlighted characters are determined by an overlapping degree between the text box of the highlighted characters and the human face box on the candidate video cover. A method for determining the rendering position of the highlighted characters is provided, which reduces the overlapping area between the highlighted characters and the human face box, makes the displayed highlighted characters clearer and more beautiful, and further improves the rendering efficiency of the highlighted characters.

Referring back to Step 260, for determining the typesetting parameter based on that a color of highlighted characters is determined based on brightness at a rendering position of the highlighted characters, exemplary details are described as follows.

In an embodiment, a computer device acquires a first region indicated by the rendering position of the highlighted characters on a candidate video cover. When brightness of the first region is greater than a fourth threshold, the computer device determines that the highlighted characters are in a first color. When the brightness of the first region is not greater than the fourth threshold, the computer device determines that the highlighted characters are in the first color, and adds a border in a second color on each of the highlighted characters.

In one embodiment, the computer device further calculates the brightness of the first region by using the following steps.

S1: Convert the first region from a red, green, and blue (RGB) space to a luminance chrominance (YUV) space.

S2: Calculate a brightness ratio of the first region, the brightness ratio being a ratio of a number of pixel points in the first region whose pixel values in the brightness (Y) space are greater than a fifth threshold to a number of all pixel points in the first region.

S3: Determine the brightness of the first region based on the brightness ratio.

In one embodiment, the first color is yellow and the RGB value is (243, 236, 42). In one embodiment, the first color is preset. In one embodiment, the first color is determined by detecting at least one of tone, hue, saturation, contrast, and brightness on the first region. For example, if the brightness of the candidate video cover is detected to be high, the first color is selected.

In one embodiment, the second color is black. The first color and the second color are two different colors. In one embodiment, the second color is preset. In one embodiment, the second color is determined by detecting at least one of tone, hue, saturation, contrast, and brightness on the first region. For example, if the brightness of the candidate video cover is detected to be high, the second color is selected (the second color can reduce the influence of the brightness of the first region on the clarity of the highlighted characters compared to the first color).

In one embodiment, the size of the border is 1 px.

In one embodiment, the fourth threshold value is 99% and the fifth threshold value is 90%.

Exemplarily, the width of the candidate video cover is w and the height is h, and there are w*h pixels in total.

When the brightness of the first region is greater than the fourth threshold value, the formula of np.sum (Y [i, j]>255*0.9)>0.99*w*h is satisfied.

When the brightness of the first region is not greater than the fourth threshold value, the formula of np.sum (Y [i, j]>255*0.9) 21 0.99*w*h is satisfied.

Np.sum ( ) represents the number of pixels counted.

Figure 12:
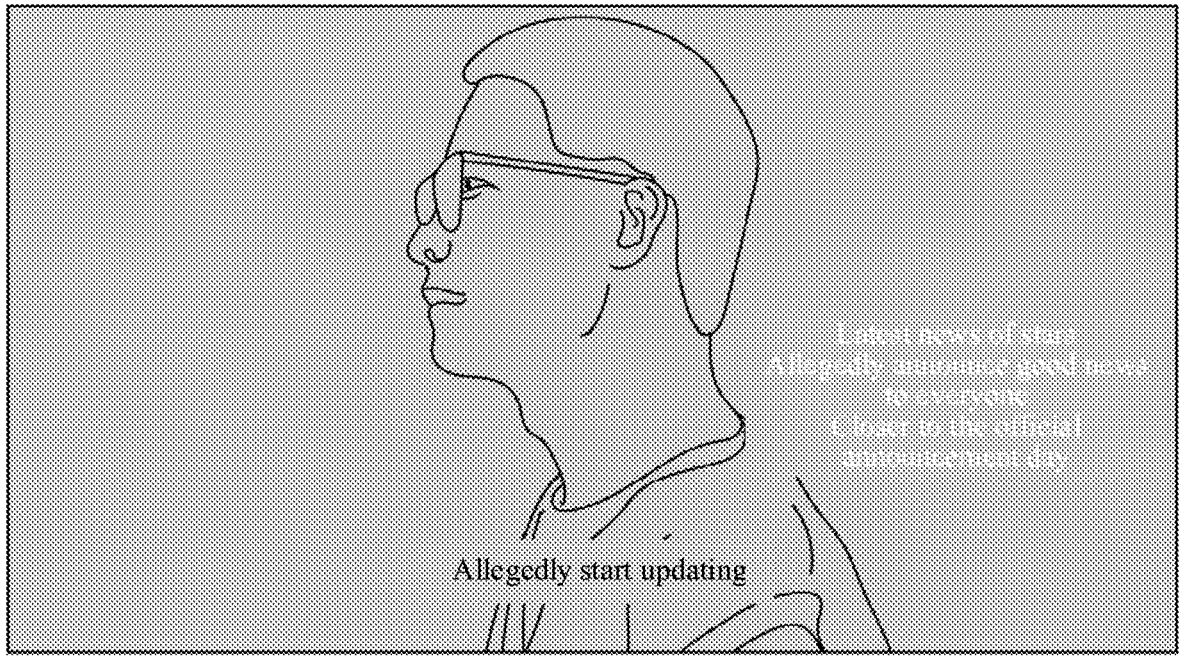
FIG. 12 is a schematic diagram of a target video cover obtained based on a third possible typesetting parameter determination manner according to an exemplary embodiment.
Figure 12:
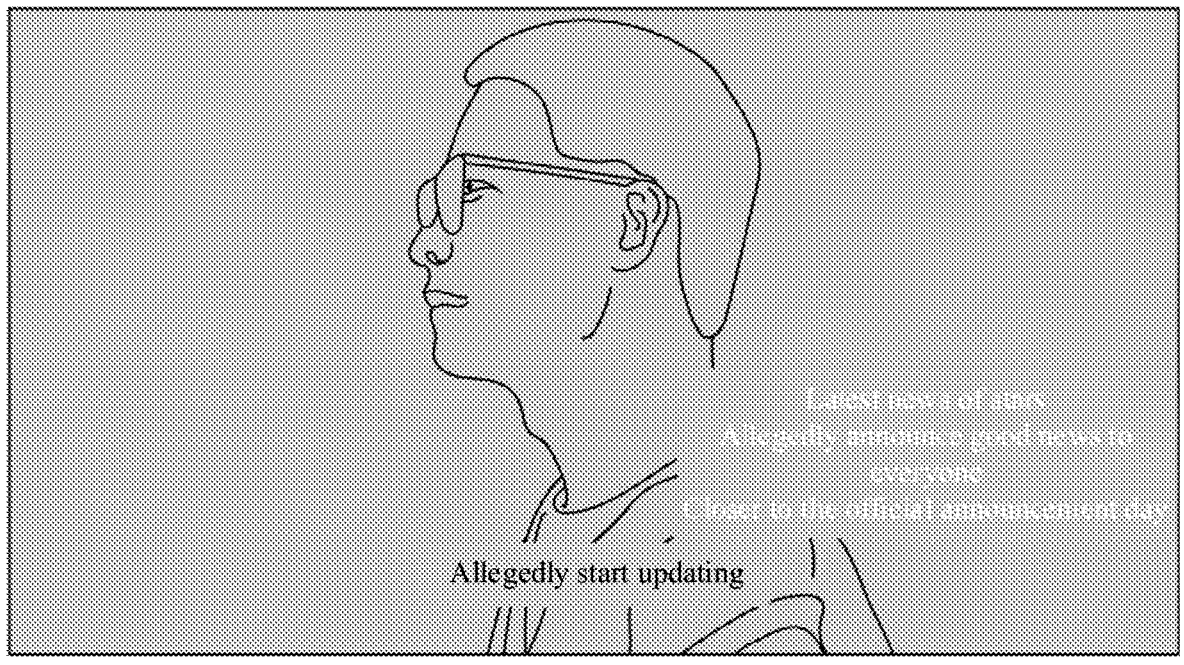

Exemplarily, FIG. 12(a) shows a schematic diagram of the highlighted characters being in a first color and rendered to the candidate video cover. FIG. 12(b) shows a schematic diagram of the highlighted characters being in a first color, adding a border in a second color on each of the highlighted characters, and then rendering to the candidate video cover.

Based on the above, the color of the highlighted characters is determined by the brightness at the rendering position of the highlighted characters. A method for determining the color of the highlighted characters is provided, which avoids the blurring of the highlighted characters on the candidate video cover, and further improves the rendering efficiency of the highlighted characters.

Referring back to Step 260, for determining the typesetting parameter based on that the font of the highlighted characters is determined based on the style of the candidate video cover, exemplary details are described as follows.

In an embodiment, the computer device determines the style of the candidate video cover through a cover detection model; then, the computer device determines a first font that matches the style of the candidate video cover; and finally, the computer device determines the first font as the font of the highlighted characters.

In one embodiment, the first font is a square font, such as italics, boldface, Song style, imitation Song style, official script, and the like. In one embodiment, the first font is an artistic font, such as a three-dimensional font, a projection font, metal font, a wood grain font, a crystal font, a flame font, an embossed font, a flowing font, a mouse-painted font, and the like.

The cover detection model is a machine learning model that predicts a style of the candidate video cover based on an image parameter and/or content of the candidate video cover.

In one embodiment, the cover detection model determines the style of the candidate video cover according to the image parameter of the candidate video cover. In one embodiment, the image parameter includes at least one of brightness, contrast, and saturation.

In one embodiment, the cover detection model further determines the style of the candidate video cover according to the content of the candidate video cover. For example, the cover detection model recognizes that the candidate video cover includes flowers, plants, animals, and the sun, and then combines the high brightness and high saturation of the candidate video cover to determine that the style of the candidate video cover is fresh and bright. The cover detection model recognizes that the candidate video cover includes fashionable clothing, tall models, and stunning shapes. Combined with the high brightness and high contrast of the candidate video cover, the style of the candidate video cover is determined to be the commercial fashion.

In one embodiment, the cover detection model is a cascaded neural network. First, the candidate video cover is inputted, and the image parameter (the brightness, the contrast, the saturation, and the like) of the candidate video cover are obtained through the image detection model. Then, the content of the candidate video cover (the animals, the plants, and the like) is obtained through the image recognition model, and finally the style matching is performed to output the style of the candidate video cover.

In one embodiment, the cover detection model is obtained by training a sample image set. In one embodiment, the sample image set includes a sample image provided with a style tag.

In one embodiment, the image recognition model is a convolutional neural network (CNN). The CNN may be an alexNet network, a VGG-16 network, and the like. Moreover, an algorithm used for training the CNN and obtaining the image recognition model may be a faster RCNN algorithm, an RCNN algorithm, and the like. In the embodiment of the present disclosure, the CNN and the algorithm for training the CNN are not specifically limited.

For example, Table 1 shows a correspondence between a style of the candidate video cover and a font of the highlighted characters below.

TABLE 1

| Style of Candidate Video Cover | Font |
| --- | --- |
| Fresh and bright | Three-dimensional font |
| Serious and scary | Boldface |
| Funny or animated | Flame font |
| Commercial or fashionable | Song typeface |

In one embodiment, the candidate video cover has a fresh and bright style, and it is determined that the three-dimensional font is used.

In one embodiment, the candidate video cover has a serious and scary style, and it is determined that the boldface is used.

In one embodiment, the candidate video cover has a funny or animated style, and it is determined that the flame font is used.

In one embodiment, the candidate video cover has a commercial or fashionable style, and it is determined that the Song typeface is used.

Based on the above, the font of the highlighted characters is determined through the style of the candidate video cover. A method for determining a font of highlighted characters is provided, which strengthens the degree of association between the highlighted characters and the candidate video cover, and further improves the rendering efficiency of the highlighted characters.

Based on the above, the first possible typesetting parameter determination manner to the fourth possible typesetting parameter determination manner not only provide four typesetting parameter determination manners of the highlighted characters, but also speeds up the determination of the typesetting parameters, thereby ensuring the rendering efficiency of the highlighted characters.

Figure 13:
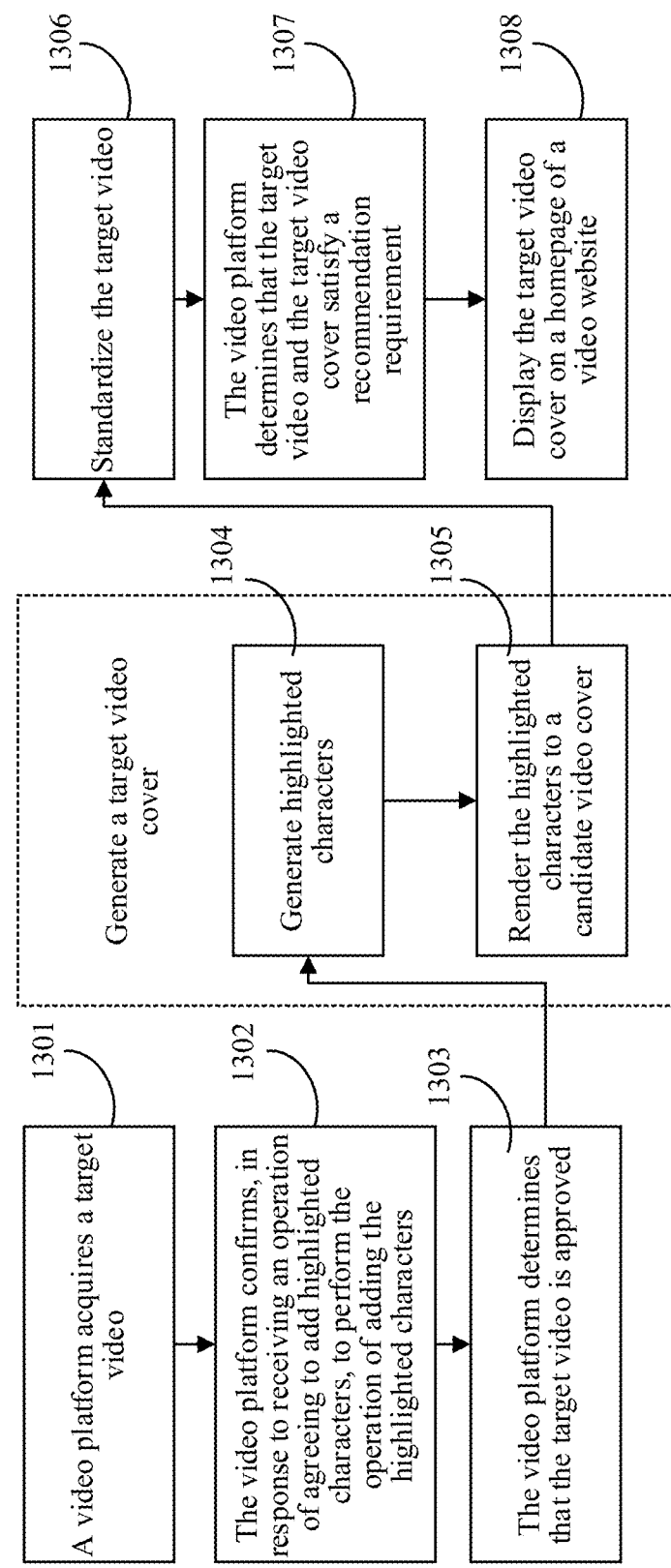
FIG. 13 is a flowchart of a method for generating a video cover according to an exemplary embodiment.

FIG. 13 is a flowchart of a method for generating a video cover according to an exemplary embodiment of the present disclosure.

Step 1301: A video platform acquires a target video.

In an embodiment, the video platform acquires the target video uploaded by the user, for example, a video log obtained by the user by recording a daily life shooting, and uploading the video log to a social platform. For another example, the user uploads the target video of educational resources to a cloud storage platform (which may be called a network disk). For another example, the user uploads a video evaluating an electronic product to a technology forum. For another example, the user uploads a micro-movie to a video content platform.

In an embodiment, the user enters a video title (also possibly referred to as an introduction, a content description, and the like) when uploading the video.

Step 1302: The video platform confirms, in response to receiving an operation of agreeing to add highlighted characters, to perform the operation of adding the highlighted characters.

When the user uploads the target video to the video platform, the video platform provides an option to add the highlighted characters. The user chooses to agree to add the highlighted characters, that is, the user agrees that the video platform determines the highlighted characters based on the video title, and renders the highlighted characters to the candidate video cover.

In response to the video platform receiving the operation of the user agreeing to add the highlighted characters, the video platform determines that the operation of adding the highlighted characters is performed.

Step 1303: The video platform determines that the target video is approved.

The video platform reviews the content of the target video, and if the content of the target video conforms to the specification, a next step is performed.

Step 1304: Generate the highlighted characters.

In an embodiment, the video platform determines the highlighted characters and the typesetting parameters of the highlighted characters based on a video title, a candidate video cover, a popular copy, a copy template, and a keyword assistant.

Step 1305: Render the highlighted characters to the candidate video cover.

The video platform renders the highlighted characters to the candidate video cover according to the highlighted characters and the typesetting parameters of the highlighted characters. In an embodiment, the candidate video cover is extracted according to the target video frame, and then a face detection and a defect detection are obtained through an image template assistant.

Step 1306: Standardize the target video.

The video platform standardizes the target video.

Step 1307: The video platform determines that the target video and the target video cover satisfy a recommendation requirement.

In one embodiment, the video platform reaches the recommended requirement by manually determining the target video and the target video cover.

Step 1308: Display the target video cover on a homepage of a video website.

The video platform determines to display the target video cover on the homepage of the video website.

Figure 14:
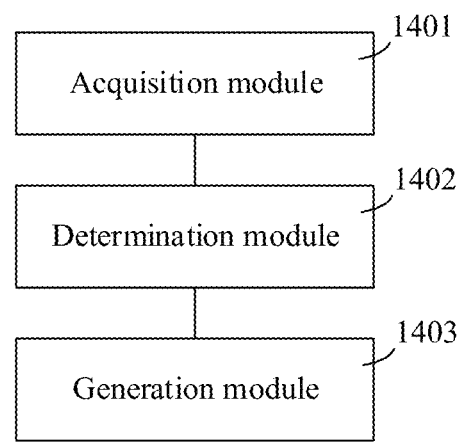
FIG. 14 is a structural block diagram of an apparatus for generating a video cover according to an exemplary embodiment.

FIG. 14 is a structural block diagram of an apparatus for generating a video cover according to an exemplary embodiment of the present disclosure. The apparatus includes: an acquisition module 1401, configured to acquire a video title and a candidate video cover of a target video; a determination module 1402, configured to determine highlighted characters of the video title; the determination module 1402 being further configured to determine typesetting parameters of the highlighted characters based on the highlighted characters and a cover parameter of the candidate video cover; and a generation module 1403, configured to generate a target video cover of the target video by rendering the highlighted characters to the candidate video cover based on the typesetting parameters.

In an exemplary embodiment, the determination module 1402 is further configured to intercept at least one phrase of the video title as the highlighted characters based on a syntactic structure of the video title.

In an exemplary embodiment, the determination module 1402 is further configured to select the first statement of the video title.

In an exemplary embodiment, the determination module 1402 is further configured to output m phrases in the first statement as m lines of texts of highlighted characters in sequence when a number m of phrases in the first statement is not greater than a first threshold n.

In an exemplary embodiment, the determination module 1402 is further configured to output n phrases in the first statement as m lines of texts of highlighted characters in sequence when a number m of phrases in the first statement is greater than a first threshold n, m and n being positive integers.

In an exemplary embodiment, the determination module 1402 is further configured to match the video title with a character recognition result and/or an audio recognition result of the target video to obtain a matching phrase.

In an exemplary embodiment, the determination module 1402 is further configured to output p matching phrases as p lines of texts of highlighted characters in sequence when a number p of the matching phrases is not greater than a second threshold value q.

In an exemplary embodiment, the determination module 1402 is further configured to output q matching phrases in the p phrases as q lines of texts of highlighted characters in sequence when a number p of the matching phrases is greater than the second threshold q, p and q being positive integers.

In an exemplary embodiment, the determination module 1402 is further configured to intercept at least one phrase in the video title based on a syntactic structure of the video title.

In an exemplary embodiment, the determination module 1402 is further configured to match the at least one phrase with a character recognition result and/or an audio recognition result of the target video.

In an exemplary embodiment, the determination module 1402 is further configured to determine the matching phrase that is of the at least one phrase and whose number of occurrences in the character recognition result and/or the audio recognition result is greater than a number threshold.

In an exemplary embodiment, the determination module 1402 is further configured to input the video title to a text generation model and output a candidate highlighted characters, and the text generation model outputs the candidate highlighted characters that matches the main idea by summarizing a main idea of the video title.

In an exemplary embodiment, the determination module 1402 is further configured to output k phrases as k lines of texts of highlighted characters in sequence when a number k of phrases in the candidate highlighted characters are not greater than a third threshold value j.

In an exemplary embodiment, the determination module 1402 is further configured to output j phrases in the candidate highlighted characters as j lines of texts of highlighted characters in sequence when a number k of phrases in the candidate highlighted characters are greater than the third threshold value j, k and j being positive integers.

In an exemplary embodiment, the determination module 1402 is further configured to divide the candidate highlighted characters by a word segmentation tool and obtains the k phrases of the candidate highlighted characters.

In an exemplary embodiment, the typesetting parameters of the highlighted characters includes a font size of the highlighted characters. The determination module 1402 is further configured to determine, based on a line having a largest number of characters in the highlighted characters and a width of the candidate video cover, a font size of the highlighted characters.

In an exemplary embodiment, the determination module 1402 is further configured to determine a line having a largest number of characters in the highlighted characters.

In an exemplary embodiment, the determination module 1402 is further configured to determine a width of a single text in a line with the largest number of characters based on the width of the candidate video cover.

In an exemplary embodiment, the determination module 1402 is further configured to determine a font size of the highlighted characters based on the width of the single text.

In an exemplary embodiment, the typesetting parameters of the highlighted characters includes a rendering position of the highlighted characters. The determination module 1402 is further configured to determine a rendering position of highlighted characters based on a degree of overlap between a text box of the highlighted characters and a human face box on a candidate video cover.

In an exemplary embodiment, the determination module 1402 is further configured to determine the text box of the highlighted characters based on the highlighted characters and the font size of the highlighted characters.

In an exemplary embodiment, the determination module 1402 is further configured to determine the human face box on the candidate video cover.

In an exemplary embodiment, the determination module 1402 is further configured to calculate an overlapping area between the text box of the highlighted characters in each of at least two candidate positions on the candidate video cover and the human face box by sliding a window.

In an exemplary embodiment, the determination module 1402 is further configured to uses, as the rendering position of the highlighted characters on the candidate video cover, the candidate position of the text box of the highlighted characters with the smallest overlapping area.

In an exemplary embodiment, the determination module 1402 is further configured to determine at least two regions covered by at least two text boxes of the highlighted characters corresponding to the minimum overlapping area when at least two minimum overlapping areas that are equal are defined.

In an exemplary embodiment, the determination module 1402 is further configured to use, as the rendering position of the highlighted characters on the candidate video cover, a candidate position of a region with the minimum variance of red, green, and blue in the at least two regions.

In an exemplary embodiment, the determination module 1402 is further configured to determine a text box with built-in characters on the candidate video cover.

In an exemplary embodiment, the determination module 1402 is further configured to calculate a sum of a first overlapping area and a second overlapping area of the text boxes of the highlighted characters on the at least two candidate positions of the candidate video cover by sliding a window, the first overlapping area being an overlapping area of the text box of the highlighted characters and the built-in text box, and the second overlapping area being an overlapping area of the text box of the highlighted characters and the human face box.

In an exemplary embodiment, the determination module 1402 is further configured to use, as the rendering position of the highlighted characters on the candidate video cover, a candidate position of a text box of the highlighted characters with the minimum sum.

In an exemplary embodiment, the typesetting parameters of the highlighted characters includes a color of the highlighted characters. The determination module 1402 is further configured to acquire a first region indicated by the rendering position of the highlighted characters on the candidate video cover.

In an exemplary embodiment, the determination module 1402 is further configured to determine that the highlighted characters are in a first color when the brightness of the first region is greater than a fourth threshold value.

In an exemplary embodiment, the determination module 1402 is further configured to determine that the highlighted characters are in a first color, and adds a border in a second color on each of the highlighted characters when the brightness of the first region is not greater than the fourth threshold.

In an exemplary embodiment, the determination module 1402 is further configured to concert the first region from a red, green, and blue (RGB) space to a luminance chrominance (YUV) space.

In an exemplary embodiment, the determination module 1402 is further configured to calculate a brightness ratio of the first region. The brightness ratio is a ratio of pixel points in the first region whose pixel values in the brightness (Y) space are greater than a fifth threshold to a number of all pixel points in the first region.

In an embodiment, the determination module 1402 is further configured to determine the brightness of the first region based on the brightness ratio.

In an exemplary embodiment, the typesetting parameters of the highlighted characters includes a font of the highlighted characters. The determination module 1402 is further configured to determine a style of the candidate video cover by a cover detection model, the cover detection model being a machine learning model that predicts a style of the candidate video cover based on an image parameter and/or content of the candidate video cover.

In an exemplary embodiment, the determination module 1402 is further configured to determine a first font that matches the style of the candidate video cover.

In an exemplary embodiment, the determination module 1402 is further configured to determine the first font as the font of the highlighted characters.

In an exemplary embodiment, the acquisition module 1401 is further configured to acquire the target video.

In an exemplary embodiment, the acquisition module 1401 is further configured to acquire, through a human face detection model, a video frame carrying a human face in the target video, the human face detection model being a machine learning model for predicting the probability of carrying the human face in the video frame of the target video.

In an exemplary embodiment, the determination module 1402 is further configured to use the video frame as the candidate video cover.

Based on the above, by determining the highlighted characters of the video title and the typesetting parameters of the highlighted characters by the apparatus, the highlighted characters are rendered to the candidate video cover, and the target video cover is finally generated. This apparatus does not require the user to manually design highlighted characters one by one, but can determine the content and the typesetting parameters of the highlighted characters only according to the video title and the candidate video cover, which greatly improves the rendering efficiency of the highlighted characters. For quickly adding the highlighted characters for a plurality videos, the contradiction between the production efficiency of the highlighted characters and the quality of the highlighted characters are adjusted.

Figure 15:
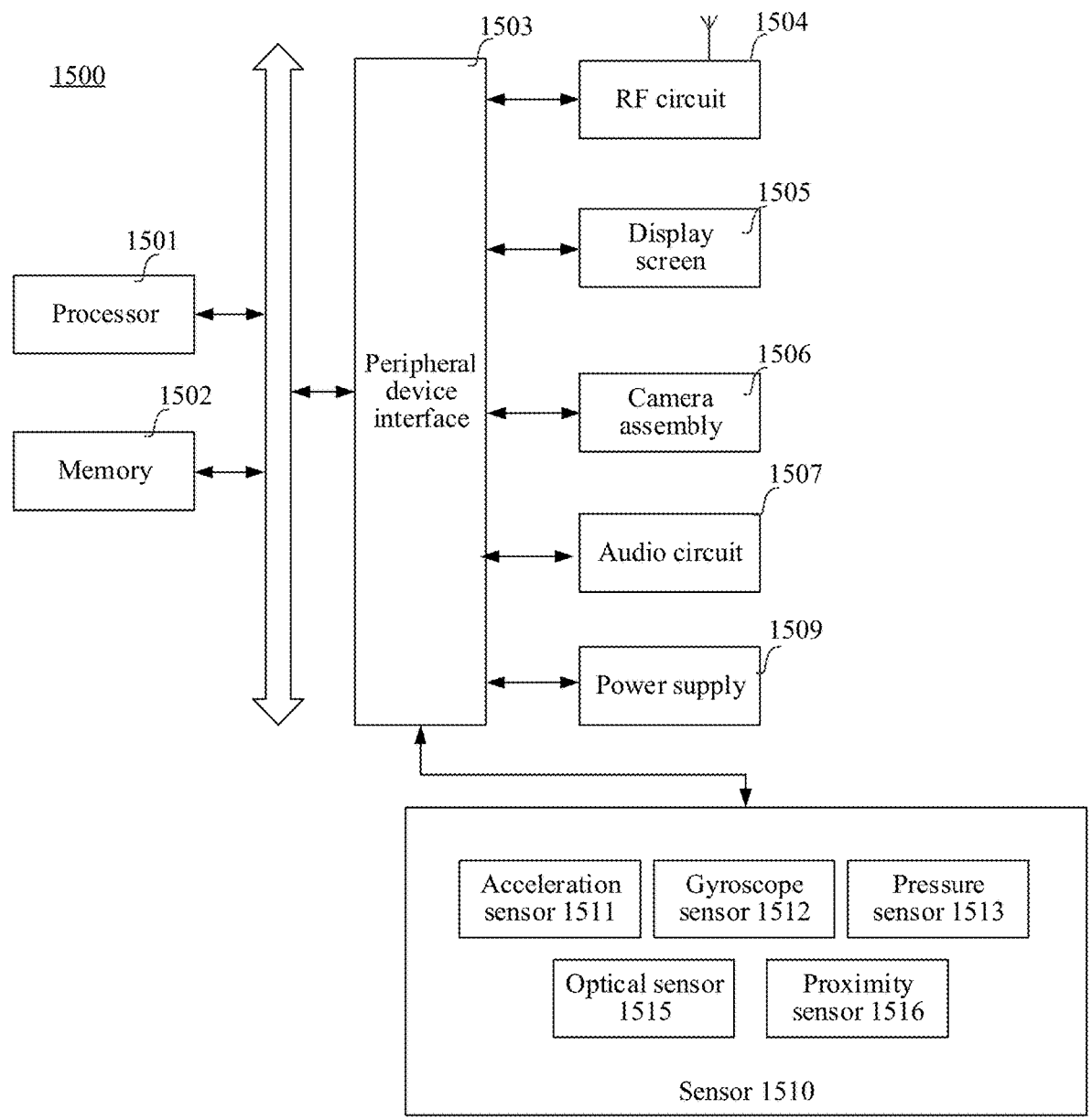
FIG. 15 is a structural block diagram of a computer device according to an exemplary embodiment.

FIG. 15 is a structural block diagram of a computer device 1500 according to an exemplary embodiment of the present disclosure. The computer device 1500 may be a terminal or a server.

Generally, the computer device 1500 includes a processor 1501 and a memory 1502.

The processor 1501 may include one or more processing cores, for example, a 4-core processor or an 8-core processor. The processor 1501 may be implemented in at least one hardware form of a digital signal processor (DSP), a field-programmable gate array (FPGA), and a programmable logic array (PLA). The processor 1501 may further include a main processor and a co-processor. In some embodiments, the processor 1501 may further include an artificial intelligence (AI) processor. The AI processor is configured to process computing operations related to machine learning.

The memory 1502 may include one or more computer-readable storage media. The computer-readable storage medium may be non-transient. The memory 1502 may further include a high-speed random access memory and a nonvolatile memory, for example, one or more disk storage devices or flash storage devices. In some embodiments, the non-transitory computer-readable storage medium in the memory 1502 is configured to store at least one instruction, and the at least one instruction being configured to be executed by the processor 1501 to implement the method for generating a video cover provided in the method embodiments of the present disclosure.

In some embodiments, the computer device 1500 may in one embodiment include a peripheral device interface 1503 and at least one peripheral device. The processor 1501, the memory 1502, and the peripheral device interface 1503 may be connected through a bus or a signal cable. Each peripheral device may be connected to the peripheral device interface 1503 by a bus, a signal line, or a circuit board. Exemplarily, the peripheral device may include at least one of a radio frequency circuitry 1504, a display screen 1505, a camera assembly 1506, an audio circuitry 1507, and a power supply 1509.

In some embodiments, the computer device 1500 further includes one or more sensors 1510. The one or more sensors 1510 include but are not limited to an acceleration sensor 1511, a gyroscope sensor 1512, a pressure sensor 1513, an optical sensor 1515, and a proximity sensor 1516.

A person skilled in the art may understand that the structure shown in FIG. 15 does not constitute a limitation on the computer device 1500, and the computer device may include more or fewer assemblies than those shown in the figure, a combination of some assemblies, or different assembly arrangements.

The present disclosure further provides a computer-readable storage medium storing at least one instruction, at least one program, a code set, or an instruction set, the at least one instruction, the at least one program, the code set, or the instruction set being loaded and executed by a processor to implement the method for generating a video cover provided in the above method embodiments.

The present disclosure provides a computer program product or a computer program. The computer program product or the computer program includes computer instructions. The computer instructions are stored in a computer-readable storage medium. The processor of the computer device reads the computer instructions from the computer-readable storage medium. The processor executes the computer instructions, so that the computer device executes the above method for generating a video cover.

As disclosed herein, by determining the highlighted characters of the video title and the typesetting parameters of the highlighted characters, the highlighted characters are rendered to the candidate video cover a method for generating the video cover is provided. This method does not require the user to design the highlighted characters one by one, but can determine the content and the typesetting parameters of the highlighted characters only according to the video title and the candidate video cover, which greatly improves the rendering efficiency of the highlighted characters. For quickly adding the highlighted characters for a plurality videos, the contradiction between the production efficiency of the highlighted characters and the quality of the highlighted characters are adjusted.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A method for generating a video cover, performed by a computer device, the method comprising:
   - acquiring a video title and a candidate video cover of a target video;
   - determining highlighted characters of the video title;
   - determining typesetting parameters of the highlighted characters based on the highlighted characters and a cover parameter of the candidate video cover; and
   - generating a target video cover of the target video by rendering the highlighted characters to the candidate video cover based on the typesetting parameters.

2. The method according to claim 1, wherein determining the highlighted characters of the video title comprises:
   - intercepting at least one phrase of the video title as the highlighted characters based on a syntactic structure of the video title.

3. The method according to claim 2, wherein intercepting the at least one phrase of the video title as the highlighted characters comprises:
   - selecting a first statement of the video title;
   - outputting m phrases in the first statement as m lines of texts of highlighted characters in sequence in response to a number m of phrases in the first statement being less than or equal to a first threshold n; and
   - outputting n phrases in the first statement as n lines of texts of highlighted characters in sequence in response to a number m of phrases in the first statement being greater than a first threshold n,
   - m and n being positive integers.

4. The method according to claim 1, wherein determining the highlighted characters of the video title comprises:
   - matching the video title with a character recognition result and/or an audio recognition result of the target video to obtain a matching phrase;
   - outputting the p matching phrases as p lines of highlighted characters in sequence in response to a number p of matching phrases being less than or equal to a second threshold q; and
   - outputting q phrases in the p matching phrases as q lines of highlighted characters in sequence in response to a number p of matching phrases being greater than the second threshold q,
   - p and q being positive integers.

5. The method according to claim 4, wherein matching the video title with the character recognition result and/or the audio recognition result of the target video comprises:
   - intercepting at least one phrase in the video title based on a syntactic structure of the video title;
   - matching the at least one phrase with the character recognition result and/or the audio recognition result of the target video; and
   - determining the matching phrase with a number of occurrences of the at least one phrase in the character recognition result and/or the audio recognition result being greater than a number threshold.

6. The method according to claim 1, wherein determining the highlighted characters of the video title comprises:
   - inputting the video title to a text generation model and outputting candidate highlighted characters, the text generation model outputting, by summarizing a main idea of the video title, the candidate highlighted characters that match main idea;
   - outputting k phrases as k lines of texts of the highlighted characters in sequence in response to a number k of phrases in the candidate highlighted characters being less than or equal to a third threshold j; and
   - outputting j phrases in the candidate highlighted characters as j lines of texts of the highlighted characters in sequence in response to a number k of phrases in the candidate highlighted characters being greater than the third threshold j,
   - k and j being positive integers.

7. The method according to claim 1, wherein the typesetting parameters of the highlighted characters comprise a font size of the highlighted characters; and
   - determining the typesetting parameters of the highlighted characters based on the highlighted characters and the cover parameter of the candidate video cover comprises:
   - determining the font size of the highlighted characters based on a line with the largest number of characters in the highlighted characters and a width of the candidate video cover.

8. The method according to claim 7, wherein determining the font size of the highlighted characters based on the line with the largest number of characters in the highlighted characters and the width of the candidate video cover comprises:
   - determining a line with the largest number of characters in the highlighted characters;
   - determining a width of a single character in the line with the largest number of characters based on the width of the candidate video cover; and
   - determining the font size of each of the highlighted characters based on the width of the single character.

9. The method according to claim 1, wherein the typesetting parameters of the highlighted characters comprise a rendering position of the highlighted characters; and
   - determining the typesetting parameters of the highlighted characters based on the highlighted characters and a cover parameter of the candidate video cover comprises:
   - determining the rendering position of the highlighted characters based on a degree of overlap between a text box of the highlighted characters and a human face box on a candidate video cover.

10. The method according to claim 9, wherein determining the rendering position of the highlighted characters based on the degree of overlap between the text box of the highlighted characters and the human face box on the candidate video cover comprises:
    - determining the text box of the highlighted characters based on the highlighted characters and the font size of the highlighted characters;
    - determining the human face box on the candidate video cover;
    - calculating an overlapping area between each of at least two candidate positions of the text box of the highlighted characters on the candidate video cover and the human face box by sliding a window; and
    - using, as the rendering position of the highlighted characters on the candidate video cover, the candidate position where the text box of the highlighted characters is located when the overlapping area is the smallest.

11. The method according to claim 10, further comprising: determining a text box with built-in characters on the candidate video cover;
    - calculating the overlapping area between each of at least two candidate positions of the text box of the highlighted characters on the candidate video cover and the human face box by sliding the window comprises:

calculating a sum of a first overlapping area and a second overlapping area of the text boxes of the highlighted characters on the at least two candidate positions of the candidate video cover by sliding a window, the first overlapping area being an overlapping area of the text box of the highlighted characters and the built-in text box, and the second overlapping area being an overlapping area of the text box of the highlighted characters and the human face box; and using, as the rendering position of the highlighted characters on the candidate video cover, the candidate position where the text box of the highlighted characters is located when the overlapping area is the smallest comprises:

using, as the rendering position of the highlighted characters on the candidate video cover, the candidate position where the text box of the highlighted characters is located when the sum is the smallest.

12. The method according to claim 1, wherein using, as the rendering position of the highlighted characters on the candidate video cover, the candidate position where the text box of the highlighted characters is located when the overlapping area is the smallest comprises:

determining, in response to at least two minimum overlapping areas existing and being equal, at least two regions covered by at least two text boxes of the highlighted characters corresponding to the minimum overlapping areas; and using, as the rendering position of the highlighted characters on the candidate video cover, a candidate position where a region with minimum variances of red, green, and blue RGB in the at least two regions is located.

13. The method according to claim 1, wherein the typesetting parameters of the highlighted characters comprise a color of the highlighted characters; and determining the typesetting parameters of the highlighted characters based on the highlighted characters and a cover parameter of the candidate video cover comprises:

acquiring a first region indicated by the rendering position of the highlighted characters on the candidate video cover;

determining that the highlighted characters are in a first color when brightness of the first region is greater than a fourth threshold; and determining that the highlighted characters are in the first color, and adding a border in a second color on each text of the highlighted characters when the brightness of the first region is not greater than the fourth threshold.

14. The method according to claim 13, further comprising:

converting the first region from a red, green, and blue (RGB) space to a luminance chrominance (YUV) space;

calculating a brightness ratio of the first region, the brightness ratio being a ratio of a number of pixel points in the first region whose pixel values in the brightness (Y) space are greater than a fifth threshold to a number of all pixel points in the first region; and determining the brightness of the first region based on the brightness ratio.

15. The method according to claim 1, wherein the typesetting parameters of the highlighted characters comprise a font of the highlighted characters, and determining the typesetting parameters of the highlighted characters based on the highlighted characters and the cover parameter of the candidate video cover comprises:

determining a style of the candidate video cover through a cover detection model, the cover detection model being a machine learning model configured to predict the style of the candidate video cover based on an image parameter and/or content of the candidate video cover;

determining a first font that matches the style of the candidate video cover; and determining the first font as the font of the highlighted characters.

16. The method according to claim 1, further comprising:

acquiring the target video;

acquiring, through a human face detection model, a video frame carrying a human face in the target video, the human face detection model being a machine learning model configured to predict a probability that the video frame of the target video carries the human face; and using the video frame as the candidate video cover.

17. A computer device, comprising: a processor and a memory, the memory storing a computer program, the computer program being loaded and executed by the processor to implement a method for generating a video cover, the method comprising:

acquiring a video title and a candidate video cover of a target video;

determining highlighted characters of the video title;

determining typesetting parameters of the highlighted characters based on the highlighted characters and a cover parameter of the candidate video cover; and generating a target video cover of the target video by rendering the highlighted characters to the candidate video cover based on the typesetting parameters.

18. The device according to claim 17, wherein determining the highlighted characters of the video title comprises:

intercepting at least one phrase of the video title as the highlighted characters based on a syntactic structure of the video title.

19. The device according to claim 18, wherein intercepting the at least one phrase of the video title as the highlighted characters comprises:

selecting a first statement of the video title;

outputting m phrases in the first statement as m lines of texts of highlighted characters in sequence in response to a number m of phrases in the first statement being less than or equal to a first threshold n; and outputting n phrases in the first statement as n lines of texts of highlighted characters in sequence in response to a number m of phrases in the first statement being greater than a first threshold n, m and n being positive integers.

20. A non-transitory computer-readable storage medium, storing a computer program, the computer program being loaded and executed by a processor to implement a method for generating a video cover, the method comprising:

acquiring a video title and a candidate video cover of a target video;

determining highlighted characters of the video title;

determining typesetting parameters of the highlighted characters based on the highlighted characters and a cover parameter of the candidate video cover; and generating a target video cover of the target video by rendering the highlighted characters to the candidate video cover based on the typesetting parameters.

* * * * *